United States Patent
Steffen et al.

(10) Patent No.: US 12,429,093 B2
(45) Date of Patent: Sep. 30, 2025

(54) ROLLER BEARING FOR SUPPORTING A PROBING UNIT OF A REALITY CAPTURE DEVICE WITH COMPENSATION FOR INCREASE IN PRELOAD

(71) Applicant: LEICA GEOSYSTEMS AG, Heerbrugg (CH)

(72) Inventors: Roman Steffen, Rebstein (CH); Matthias Wozasek, Höchst (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 119 days.

(21) Appl. No.: 18/134,481

(22) Filed: Apr. 13, 2023

(65) Prior Publication Data

US 2023/0332648 A1    Oct. 19, 2023

(30) Foreign Application Priority Data

Apr. 14, 2022 (EP) ...................... 22168619

(51) Int. Cl.
*F16C 41/00* (2006.01)
*F16C 19/06* (2006.01)

(52) U.S. Cl.
CPC .............. *F16C 41/00* (2013.01); *F16C 19/06* (2013.01); *F16C 2233/00* (2013.01)

(58) Field of Classification Search
CPC ......... F16C 19/06; F16C 19/166; F16C 41/00
See application file for complete search history.

(56) References Cited

U.S. PATENT DOCUMENTS

| | | | |
|---|---|---|---|
| 2009/0263062 A1* | 10/2009 | Smith | F16C 35/061 384/476 |
| 2019/0011536 A1* | 1/2019 | Ohtomo | G01S 7/4817 |
| 2020/0200872 A1* | 6/2020 | Bockem | G01S 7/4802 |
| 2020/0209394 A1 | 7/2020 | Mark et al. | |

FOREIGN PATENT DOCUMENTS

| | | |
|---|---|---|
| DE | 37 41 774 A1 | 6/1989 |
| DE | 10 2008 026 202 A1 | 12/2009 |
| WO | 2017/042402 A2 | 3/2017 |

OTHER PUBLICATIONS

Extended European Search Report dated Oct. 4, 2022 as received in Application No. 22168619.9.

* cited by examiner

Primary Examiner — Thanh Luu
(74) Attorney, Agent, or Firm — Maschoff Brennan

(57) ABSTRACT

A reality capture device, particularly a reality capture device having a lightweight construction, being configured for generating a digital representation of an environment. The reality capture device comprises a probing unit with a pivoting component configured to be pivoted relative to a base part of the reality capture device in order to generate probing data of the environment. The pivoting component is mounted on the base part by a four-point roller bearing configured as wire race bearing. Applicability of a four-point roller bearing in the form of a wire race bearing for supporting the probing unit of the reality capture device is achieved by a specific design of the inner and/or outer race supporting the raceway wires in order to reduce unwanted pressure in the bearing, e.g. due to thermal behavior.

19 Claims, 3 Drawing Sheets

ROLLER BEARING FOR SUPPORTING A PROBING UNIT OF A REALITY CAPTURE DEVICE WITH COMPENSATION FOR INCREASE IN PRELOAD

BACKGROUND

The present disclosure relates to a reality capture device for generating a digital representation of an environment, particularly a mobile reality capture device having a lightweight construction designed for weight reduction.

By way of example, surveying and modeling of an environment by using a reality capture device are used to assess an actual condition of an area of interest, e.g. a restricted or dangerous area such as a construction site, an industrial plant, a business complex, or a cave. For example, modeling of a building and surrounding terrain is of interest for architects or craftsmen in order to quickly assess an actual condition of a room or a construction progress of a construction site, e.g. to efficiently plan the next work steps. By means of a digital visualization of the actual state, e.g. in the form of a point cloud or a vector file model, or by means of an augmented reality functionality different options for further steps or expansion options can be examined and optionally presented to an employee or a customer in an easily accessible way.

In order to generate a digital, e.g. three-dimensional, environment model, various types of sensors can be used, e.g. a laser scanner, an imaging camera, a camera arrangement for photogrammetry, or a range imaging sensor. Nowadays, referencing and fusion of different data types, e.g. laser scanner data, camera data, and positioning data such as from a global navigation satellite system, are now increasingly standardized.

By way of example, an environment can be optically scanned and measured by means of a laser scanner emitting a laser measurement beam, e.g. using pulsed electromagnetic radiation, wherein an echo is received from a backscattering surface point of the environment and a distance to the surface point is derived and associated with an angular emission direction of the associated laser measurement beam. This way, a three-dimensional point cloud is generated. For example, the distance measurement may be based on the time of flight, the shape, and/or the phase of the pulse. For additional information, the laser scanner data may be combined with camera data, e.g. to provide high-resolution spectral information, e.g. by means of an RGB camera or an infrared camera.

Nowadays, robotic vehicles, particularly autonomous robotic vehicles, are increasingly used to facilitate data acquisition and to reduce risks on human workers. Many different types of autonomous robotic vehicles are known. For example, ground based robotic vehicles may have a plurality of wheels for propelling the robot, typically having sophisticated suspension to cope with different kinds of terrain. Another widely used type is a legged robot, e.g. a four-legged robot, which is often able to handle tough terrain and steep inclines. Aerial robotic vehicles, e.g. quadcopter drones, allow further versatility to survey areas that are difficult to access.

Unmanned Arial Vehicles (UAV) and Unmanned Ground Vehicles (UGV) are for themselves state-of-the-art platforms for multilateral use. Equipped with various kinds of sensors, these platforms provide for autonomous path planning and for autonomously moving an acquisition unit for acquiring 3D surveying and reality capture data.

Combining a reality capture device with a robotic vehicle, particularly with a UAV, typically comes with challenges regarding limited surveying time and/or sensor complexity due to limited load capacity and battery power of the robotic vehicle. In order to provide sufficient measurement accuracies, e.g. for accurate 3D modeling, and measurement reproducibility reality capture devices are often constructed in a heavy and bulky manner. In addition, power consumption of a reality capture device is typically quite high. For example, power consumption is driven by the required processing power for handling the measurement data and, for example, by high power consumption of a laser source in case laser radiation is used for surveying.

Recently, e.g. driven by attempts to combine reality capture devices with robotic vehicles, there is a demand for miniaturized and lightweight reality capture devices, which still provide many functionalities and properties in relation to the measurement process and measurement accuracy of earlier devices. Particular problems in miniaturizing such devices relate to maintaining the required mechanical and thermal stability, e.g. such that moving components have little play in order to provide the required mechanical and opto-mechanical accuracy. Often, a more compact design is feasible but on the cost of using still heavy materials or even heavier materials as before in order to maintain the mechanical rigidity and accuracy.

By way of example, WO 2017/042402 A2 discloses different aspects for providing a compact design of a reality capture device. In particular, the document describes a compact way to support a pivot component on a base part by using a four-point roller bearing, the pivot component comprising a rotating beam deflection unit for deflecting and emitting a distance measurement beam. Although such a design may offer advantages in terms of miniaturization, the roller bearing is nevertheless preferably constructed from heavy materials, e.g. with steel races, to ensure sufficient rigidity and durability of the bearing.

SUMMARY

It is therefore an object of the present disclosure to provide a reality capture device of lightweight construction, which overcomes deficiencies of the prior art and maintains or improves measurement accuracy of earlier devices.

A further object is to provide a reality capture device of lightweight construction, which maintains or improves durability of earlier devices. Lightweight construction is a design philosophy that particularly saves weight and, for example, power consumption. By way of example, lightweight construction often involves use of metallic lightweight materials such as aluminum, magnesium, high-strength steels, titanium, and fiber composites.

A particular object is to provide a reality capture device of lightweight construction to be mounted on a robotic vehicle, particularly a UAV, which provides longer surveying time and/or reduced power consumption while maintaining overall sensor complexity.

The disclosure relates to a reality capture device, comprising a probing unit configured to generate probing data for generating a, e.g. three-dimensional, digital representation of an environment. The probing unit comprises a pivoting component configured to be pivoted relative to a base part of the reality capture device in order to generate the probing data, for which the pivoting component is mounted on the base part by a four-point roller bearing in the form of a pivot bearing with an outer race and inner race being under a preload against each other and which mutually support each other by rolling bodies, e.g. bearing balls, arranged between them. In particular, each of the outer and inner race is formed in one piece.

For example, the reality capture device is configured to generate the probing data during movement of the reality capture device, e.g. wherein the pivoting component is pivoted about the pivot axis in order to set an acquisition direction for generating the probing data relative to the base part.

The four-point roller bearing is configured as wire race bearing with the outer and inner race each hosting two raceway wires extending in a guide direction such that the rolling elements can roll on the raceway wires to provide a pivoting of the inner race relative to the outer race about a pivot axis. Each of the two raceway wires of a respective race is supported by (e.g being in contact with) a respective circumferential portion of the respective race. At least one of the outer and inner race comprises recesses, e.g. recesses that completely penetrate the respective race in the radial direction, the radial direction being related to pivoting about the pivot axis. An arrangement and dimensions of the recesses are tuned to provide for an elasticity of at least one of the circumferential portions along a pressing direction onto the raceway wire supported by the at least one of the circumferential portions, wherein the pressing direction is defined by the preload.

By way of example, the arrangement and dimensions of the recesses are such that in case of an increased pressure along the pressing direction due to a relative thermal size change between the outer and inner race within a predefined operating range, the preload is maintained within a predefined tolerance range for the thermal size change by allowing an elastic deformation of the one of the circumferential portions defined by the elasticity.

By way of example, the preload is set on the basis of a minimal defined torque for a rotation of the pivoting component about the pivot axis. The bearing is mounted with an initial radius of used bearing balls, after which the torque is measured. In case the resulting torque is out of the defined specification, the bearing is dismounted and the radius of the bearing balls is adjusted. These steps are repeated until the resulting torque is within specs. After that, the bearing are run, e.g. during 24 hrs.

For example, the use of a four-point roller bearing in the form of a wire race bearing provides for a compact and lightweight design because the inner and outer race are not directly exposed to stressing by the rolling process. This allows to build the races from lightweight materials instead of requiring a rigid and heavy steel enclosing. On the other hand, four-point roller bearings are generally sensitive to one-sided temperature changes on the inner and outer race. If such an asymmetry occurs, there is either play in the bearing or the preload increases significantly. Both can damage the bearing over time. Temperature sensitivity can be even become more pronounced when using lightweight materials such as aluminum.

According to one aspect, applicability of a four-point roller bearing for a reality capture device of lightweight construction is achieved by a specific design of the inner and/or outer race to reduce unwanted pressure in the bearing due to thermal behavior.

In one embodiment, the at least one of the circumferential portions comprises along the guide direction several individually deformable segments supporting the respective raceway wire, each of the individually deformable segments being elastically deformable in radial direction independently of the other individually deformable segments, the radial direction being related to pivoting about the pivot axis.

For example, the recesses are arranged at a plurality of locations in the guide direction and have an extent parallel to the pivot axis, e.g. wherein the recesses run parallel to the pivot axis, thereby providing lips spaced apart from one another in the guide direction, which lips can be elastically bent by forces applied thereto in the radial direction, thereby providing the individually deformable segments. For example, the recesses are perpendicular to the guide direction.

By way of example, the individually deformable segments have an elasticity in the radial direction tuned to provide for a nominal preload of the outer and inner race towards each other. The specifically tuned elasticity further ensures elastic deformation of the individually deformable segments when there is a change in a nominal radial force acting on the individually deformable segments, e.g. due to thermal size change of the races, so that the preload between the outer and inner ring remains within a predefined tolerance range around the nominal preload.

By way of example, the length of the recesses is matched with the material and dimensions of the respective race to provide a specifically tuned elasticity of the created lips. In one embodiment, the recesses extend in the axial direction with respect to the pivot axis at least over an area occupied by the one of the raceway wires in the axial direction.

In a further embodiment, the at least one of the outer and inner race comprises a groove extending in the guide direction on the side of the one of the circumferential portions facing away from a contact surface of the one of the circumferential portions with the respective raceway wire, thereby providing freedom of movement of the lips in the radial direction. Freedom of movement of the individually deformable segments can further be ensured by providing a dedicated installation of the bearing within the reality capture device, i.e. not by the bearing itself.

In a further embodiment, the at least one of the outer and inner race provides along the guide direction a number of the individually deformable segments which at least corresponds to half a number of the rolling bodies, particularly wherein the number of the individually deformable segments at least corresponds to the number of rolling bodies.

In a further embodiment, both the raceway wires hosted by the at least one of the outer and inner race are supported by deformable segments, wherein the at least one of the outer and inner race comprises along the guide direction several further individually deformable segments supporting a further one of the raceway wires, each of the further individually deformable segments being elastically deformable in radial direction independently of the other of the further individually deformable segments.

In particular, the further individually deformable segments are formed by recesses arranged on the other of the circumferential portions of the at least one of the outer and inner race at a plurality of locations in the guide direction. These recesses have an extent parallel to the pivot axis, e.g. they run parallel to the pivot axis, thereby providing lips spaced apart from one another in the guide direction, which lips can be elastically bent by forces applied thereto in the radial direction, thereby providing the further individually deformable segments.

The number of recesses of the circumferential portions of the upper and lower raceway wire can be different in number and design depending on the desired thermal behavior or desired stiffness.

By way of example, the pivoting component is mounted on the inner race (to co-move with the pivot motion by the inner race) and at least the outer race comprises recesses associated to the upper and lower raceway wire. If the inner race heats up (e.g. due to the power loss of the probing unit mounted on the inner ring), the preload in the bearing increases significantly. In particular, the situation can worsen if, for example, the reality capture device is operated outdoors in a cold environment and the outer race tends to get smaller because it is connected to an outer housing of the reality capture device. The resulting pressure due to such thermal gradients can be relieved with the recesses in the outer race, with the result that the desired preload is maintained within a defined tolerance range.

In a further embodiment, the recesses are arranged between the two raceway wires of the at least one of the outer and inner race and have a longitudinal extent parallel to the guide direction, e.g. wherein the recesses run parallel to the guide direction.

By way of example, the recesses are arranged in parallel lines, wherein recesses of different parallel lines are arranged offset to one another in the guide direction.

In a further embodiment, the outer and inner race are made of a high-performance material for lightweight construction, e.g. a high-performance aluminum material for lightweight construction. For example, the outer and inner race are made from DISPAL®.

In a further embodiment, the reality capture device has a lightweight construction designed for weight reduction.

In a further embodiment, the pivoting component comprises a radiation source for generating a measuring beam for time-of-flight-based distance measurement, e.g. a laser source. By way of example, such radiation source often dissipates a lot of energy in the form of heat. However, particularly in a lightweight construction, e.g. for application on a UAV, there may not be sufficient load-carrying capacity to include an active temperature control system, e.g. such as a Peltier cooling system, which gives rise to increased preload in the four-point roller bearing due to thermal gradients as described above.

In a further embodiment, the reality capture device is embodied to be free of active temperature control for the four-point roller bearing. In particular, the reality capture device as such is embodied to be free of any active temperature control.

One advantage of using a four-point roller bearing is that the pivoting component of the probing unit can mounted in a stable manner on the base part by only using a single bearing ring, e.g. with the mechanical stabilization being effected exclusively by the single bearing ring and a radial prestress of the outer and inner race. This allows a compact design. Thanks to the specific configuration of the individual deformable segments, this compact design can be used in the form of a wire race bearing, which allows a compact and at the same time lightweight design of the reality capture device.

In a further embodiment, the pivoting component is configured to set an acquisition direction for generating the probing data by the probing unit relative to the reality capture device. For example, the pivoting component comprises a beam outlet for a measuring beam for time-of-flight-based distance measurement. The four-point roller bearing is embodied as a bearing with a single bearing ring (one row of rolling bodies, i.e. the inner and outer bearing races are designed to provide a single-row four-point roller bearing), wherein the pivoting component is supported only by the four-point roller bearing on the base part.

In a further embodiment, the probing unit is embodied as a laser scanner configured to carry out a scanning movement of a laser measurement beam, particularly relative to two rotation axes, and, based thereof, to generate light detection and ranging data for generating the digital representation of the environment.

By way of example, the laser scanner comprises a rotating body for deflecting the outgoing laser measurement beam and returning parts of the laser measurement beam, the rotating body being mounted on the pivoting component and being rotatable relative to the pivoting component. The light detection and ranging data are generated by a continuous rotation of the pivoting component about the pivot axis and a continuous rotation of the rotating body relative to the pivoting component while the laser measurement beam is emitted via the rotating body.

In a further embodiment, the reality capture device is specifically configured to be mounted on an unmanned aerial vehicle for indoor and outdoor flights or is embodied as an unmanned aerial vehicle for indoor and outdoor flights.

In particular, the reality capture device may be configured to provide autonomous movement. For example, the reality capture device is configured to provide probing data and referencing data at the same time, e.g. wherein at least trajectory data of the device, e.g. position and/or pose data, are provided with the probing data, e.g. laser scanner data and/or camera data, such that probing data of different positions of the reality capture device can be combined into a common coordinate system. In particular, the reality capture device is configured to autonomously create a 3D map of a new environment, e.g. by means of a simultaneous localization and mapping (SLAM) functionality.

The three-dimensional model data may then be analyzed by means of a feature recognition algorithm for automatically recognizing semantic and/or geometric features captured by the probing data, e.g. by means of using shape information provided by virtual object data from a CAD model. Such feature recognition, particularly for recognizing geometric primitives, are nowadays widely used to analyze 3D data.

BRIEF DESCRIPTION OF THE DRAWINGS

The reality capture device according to the different aspects are described or explained in more detail below, purely by way of example, with reference to working examples shown schematically in the drawing. Identical elements are labelled with the same reference numerals in the figures. The described embodiments are generally not shown true to scale and they are also not to be interpreted as limiting. Specifically.

DETAILED DESCRIPTION

Figure 1:
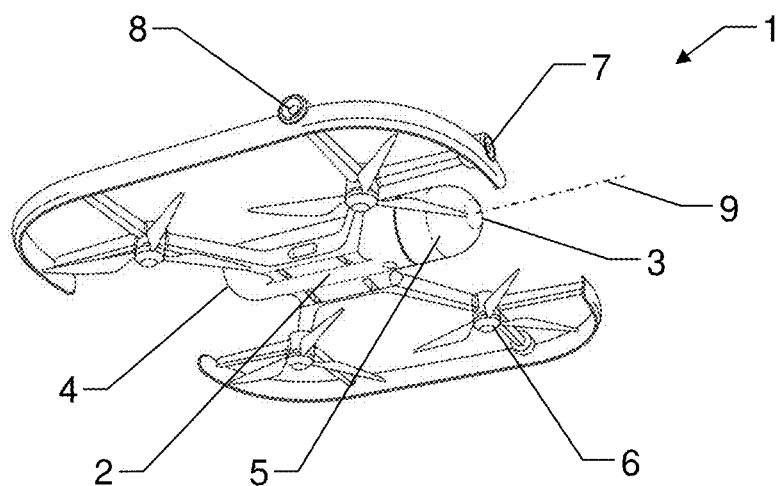
FIG. 1: an exemplary embodiment of the reality capture device in the form of an unmanned aerial vehicle.

FIG. 1 shows an exemplary embodiment of the inventive reality capture device 1 in the form of an unmanned aerial vehicle (UAV), having a body 2 with a front end 3 and a back end 4. The probing unit 5 is integrated in the front end 3 of the UAV. The UAV further has four propulsion units 6 realized in form of rotary wing/propeller units. Two propulsion units are arranged on a left side and on a right side of the body 2.

By way of example, the UAV further includes a front camera 7 and a side camera 8, which are arranged at locations, where the shrouding of the UAV is connecting to strut elements of the mounting structures. Further cameras may be arranged to have a downward and/or an upward viewing direction, e.g. a camera is arranged on the upper side of the body 2, with respect to a flying position, and a further camera is arranged on the bottom side.

The probing unit 5 is configured to generate probing data for deriving a digital representation of the environment. For example, the probing unit comprises a sensor arrangement for geometric scanning of the surroundings of the reality capture device 1, e.g. a camera arrangement for photogrammetry and/or a laser-based time-of-flight sensor. An acquisition direction of the sensor arrangement is set by a pivoting component (see FIG. 2), which can be pivoted about a pivot axis 9. For example, the pivoting component comprises the beam exit and the camera arrangement mentioned before, which are co-moving with the pivoting component.

For example, the reality capture device 1 is configured for autonomous movement by means of simultaneous localization and mapping (SLAM). Probing data and referencing data are generated at the same time, allowing the reality capture device to derive trajectory data of the device, such that probing data of different positions of the reality capture device can be combined into a common coordinate system, e.g. in real time or in post-processing.

By way of example, the reality capture device 1 is small, e.g. such that it can be flown in an indoor environment. This causes challenges regarding limited surveying time and/or sensor complexity due to limited load capacity and battery power. According to one aspect, applicability of a four-point roller bearing of lightweight construction is achieved by implementing the bearing in the form of a wire race bearing and by using a specific design of the inner and/or outer race to reduce unwanted pressure in the bearing due to thermal behavior.

Figure 2:
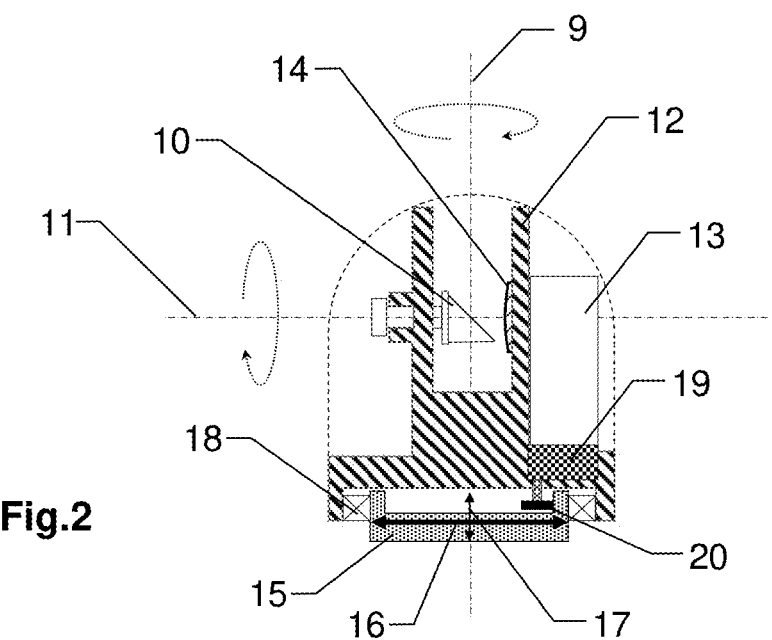
FIG. 2: a schematic depiction of an exemplary embodiment of a probing unit.

FIG. 2 shows a schematic depiction of an embodiment of a probing unit, here exemplarily implemented in the form of a so-called two-axis laser scanner. The laser scanner comprises a rotating body 10 for deflecting the outgoing laser measurement beam and returning parts of the laser measurement beam about a first axis of rotation 11, often referred to as fast axis or horizontal axis. The rotating body 10 is mounted on a pivoting component 12, wherein light detection and ranging data are generated by a continuous rotation of the pivoting component 12 about the pivot axis 9 and a continuous rotation of the rotating body 10 relative to the pivoting component 12 while the laser measurement beam is emitted via a deflecting surface of the rotating body. The laser measurement beam is generated by a distance measuring unit 13 which, for example, generates pulsed laser radiation for providing distance measurements based on the so-called pulse time-of-flight principle. The laser measurement beam is emitted via a beam exit 14 towards the deflecting surface of the rotating body 10.

In order to ensure a mounting of the pivoting component 12 without play and thus with the least possible tilting/wobbling of the pivoting component 12 with respect to a base part 15 the mounting is typically configured in a way to provide an effective stabilization area for stabilizing the pivoting component 12 that is as axially extended as possible along the pivot axis 9. Therefore, in the prior art a so-called standing axis of the pivoting component is often chosen to be as long (or high) as possible relative to the total volume of the pivoting component.

One possibility to provide an axially compact (short) design of the mounting is the use of a four-point roller bearing, which can provide sufficient stabilization against tilting/wobbling of the standing axis with only a short overall effective axial stabilization area. In order to nevertheless prevent the pivoting component 12 from tilting/wobbling relative to a base part 15, the transverse extension 16 of the bearing perpendicular to the pivot axis 9 is greater than the axial extension 17 of the bearing in the direction of the pivot axis 9.

Figure 5:
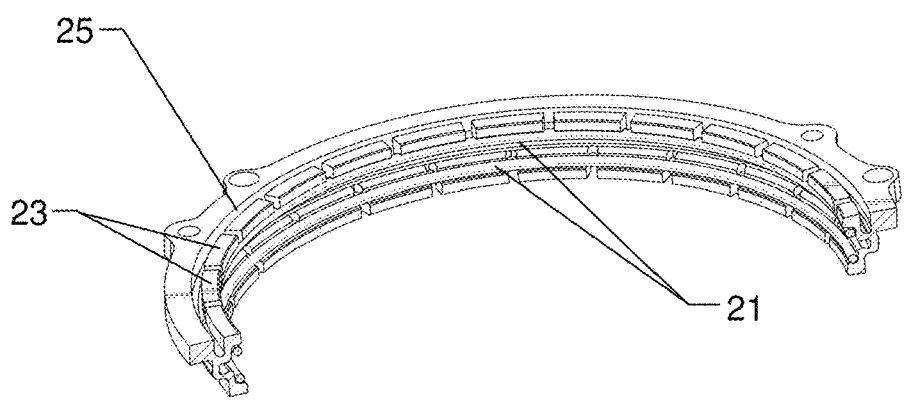
FIG. 5: an exemplary embodiment of an outer race with individually deformable segments according to the according.
Figure 6:
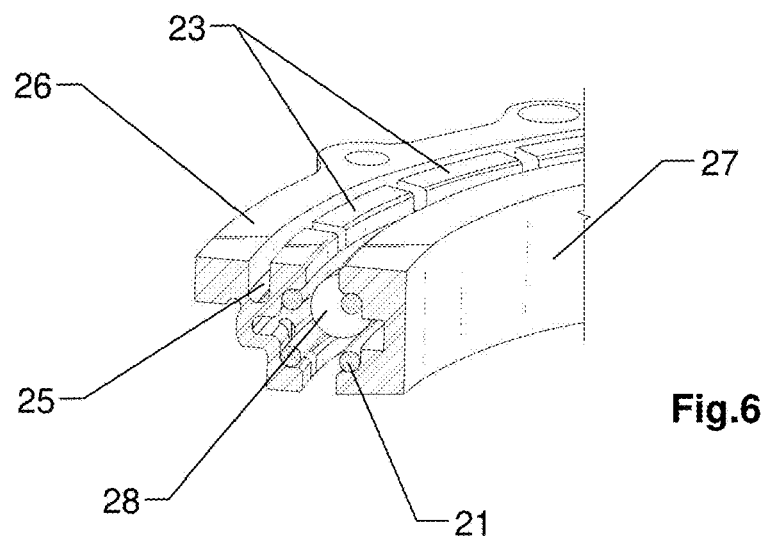
FIG. 6: an exemplary embodiment of a four-point roller bearing configured as wire race bearing, wherein only the outer race comprises individually deformable segments.

By way of example, this allows to mount the pivoting component 12 on the base part 15 by using a single bearing ring 18, wherein the stabilization is effected exclusively by the single bearing ring 18, which is under high prestress acting radially to the pivot axis 9. In order to provide such a four-point roller bearing in a lightweight construction, the four-point roller bearing is configured as a wire race bearing with individually deformable segments (FIGS. 4 to 6).

Pivoting of the pivoting component 12 about the pivot axis 9 is provided by a drive motor 19 which, for example, is arranged on (i.e. fixed with) the pivoting component 12. In the example shown, the drive is designed as a friction wheel drive, with a drive shaft running parallel to the pivot axis 9 to the base part 15, wherein a running wheel 20 rolls along a circularly symmetrical running surface of the base part 15.

Figure 3:
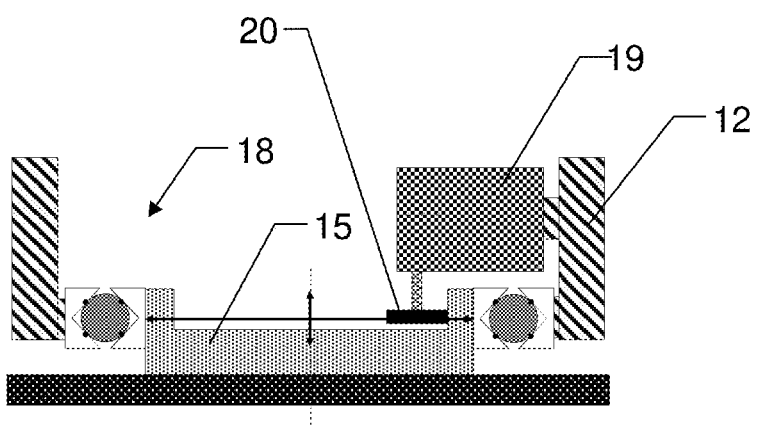
FIG. 3: a schematic depiction of a pivoting component of a probing unit mounted on a base part of the reality capture device by means of a four-point roller bearing.

FIG. 3 gives a zoomed-in view of FIG. 2 showing in more detail the mounting of the pivoting component 9 on the base part 15 by means of a four-point roller bearing 17.

Figure 4:
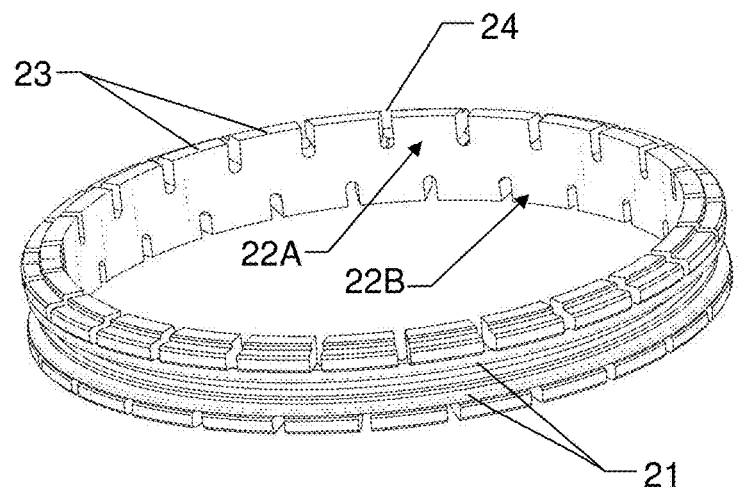
FIG. 4: an exemplary embodiment of an inner race with individually deformable segments.

FIG. 4 shows an exemplary embodiment of an inner race hosting two raceway wires 21 extending in a guide direction. Each raceway wire 21 is supported by an annular support member 22A, 22B each comprising several individually deformable segments 23.

In the example shown, the individually deformable segments 23 are formed as lips generated by recesses 24 of the race at several locations in the guide direction, the recesses 24 running parallel to the pivot axis. The lips 23 can be elastically bent by forces applied thereto in the radial direction, wherein the lips 23 have an elasticity in the radial direction tuned to provide for a nominal preload of the outer and inner race towards each other. The specifically tuned elasticity further ensures elastic deformation of the lips 23 when there is a change in a nominal radial force acting on the bearing, e.g. due to thermal size change of the races, so that the preload between the outer and inner ring remains within a predefined tolerance range around the nominal preload.

FIG. 5 shows a section of an exemplary embodiment of an outer race hosting two raceway wires 21 extending in a guide direction. Similarly to the inner race depicted by FIG. 4, each raceway wire 21 is supported by several individually deformable segments 23, wherein each of the individually deformable segments 23 is elastically deformable in radial direction independently of the other individually deformable segments.

Here, the race further comprises a groove 25 extending in the guide direction on the side of the individually deformable segments 23 facing away from a contact surface of the segments 23 with the respective raceway wire 21. By way of example, this groove 25 provides freedom of movement such that the segments 23 can be elastically bent in the radial direction.

FIG. 6 depicts a section of an exemplary embodiment of a four-point roller bearing configured as wire race bearing, wherein only the outer race 26 comprises individually deformable segments 23. The outer race 26 and the inner race 27 are preloaded towards each other and mutually support each other by bearing balls 28 arranged between them, wherein the bearing balls 28 roll on the raceway wires 21 to provide a pivoting of the inner race 27 relative to the outer race 26.

Figure 7:
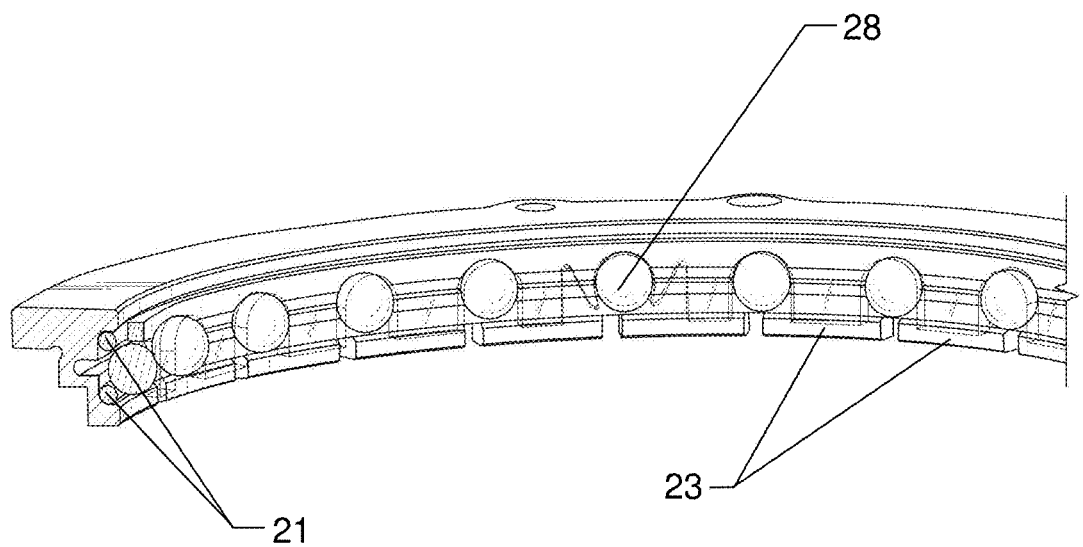
FIG. 7: a further exemplary embodiment of an outer race with individually deformable segments only with respect to one of the two circumferential support portions.

FIG. 7 depicts a further exemplary embodiment of an outer race with individually deformable segments only with respect to one of the two circumferential support portions (lower portion in the figure).

Figure 8:
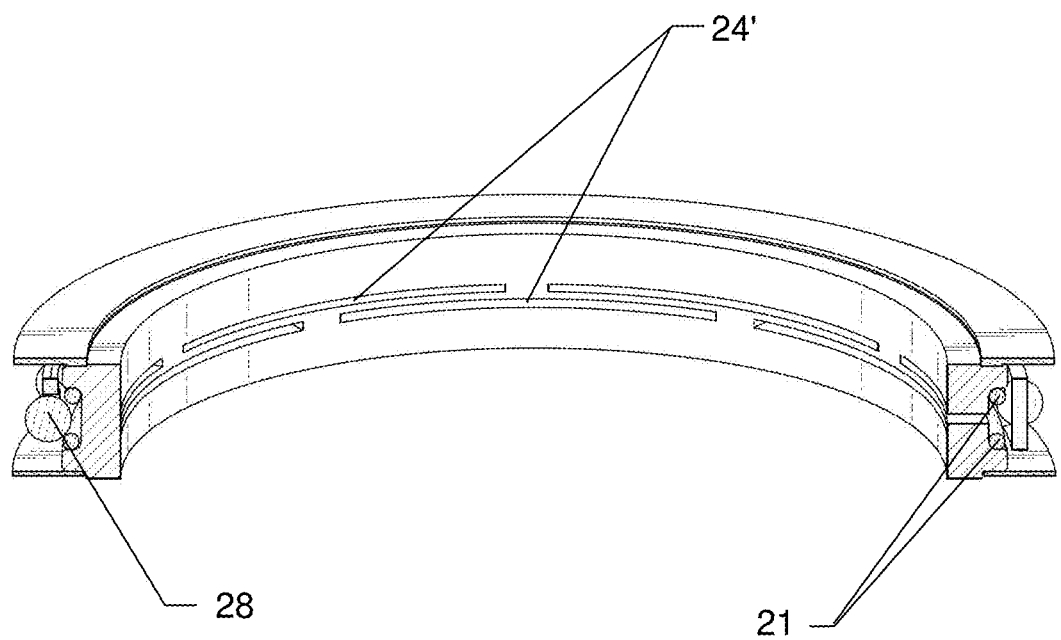
FIG. 8: a further exemplary embodiment of an inner race with recesses running parallel to the guide direction.

FIG. 8 depicts a further exemplary embodiment of an inner race with recesses 24' running parallel to the guide direction. The recesses 24' are arranged between the two raceway wires 21 of the inner race and arranged in two parallel lines, here one line parallel on each side of a central plane through the bearing. In the guide direction, the recesses 24' are arranged offset to one another, wherein recesses of the upper line cover the distances between consecutive recesses of the bottom line.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A reality capture device, comprising a probing unit configured to generate probing data for generating a digital representation of an environment, wherein the probing unit comprises a pivoting component configured to be pivoted relative to a base part of the reality capture device in order to generate the probing data, for which the pivoting component is mounted on the base part by a four-point roller bearing in the form of a pivot bearing with an outer race and inner race being under a preload against each other and which mutually support each other by rolling bodies arranged between them, wherein:
the four-point roller bearing is configured as wire race bearing with the outer and inner race each hosting two raceway wires extending in a guide direction such that the rolling bodies can roll on the raceway wires to provide a pivoting of the inner race relative to the outer race about a pivot axis, each of the two raceway wires of a respective race being supported by a respective circumferential portion of the respective race, and
exactly one of the outer and inner race comprises recesses, wherein an arrangement and dimensions of the recesses are tuned to provide for an elasticity of at least one of the circumferential portions along a pressing direction onto the raceway wire supported by the at least one of the circumferential portions, such that in case of an increased pressure along the pressing direction due to a relative thermal size change between the outer and inner race within a predefined operating range, the preload is maintained within a predefined tolerance range around a nominal preload.

2. The reality capture device according to claim 1, wherein the recesses extend in an axial direction with respect to the pivot axis at least over an area occupied by the respective raceway wire in the axial direction.

3. The reality capture device according to claim 1, wherein the recesses are arranged between the two raceway wires of the at least one of the outer and inner race and have a longitudinal extent parallel to the guide direction, wherein the recesses run parallel to the guide direction, wherein the recesses are arranged in parallel lines, wherein recesses of different parallel lines are arranged offset to one another in the guide direction.

4. The reality capture device according to claim 1, wherein the outer and inner race are made of a high-performance material for lightweight construction, particularly a high-performance aluminum material for lightweight construction.

5. The reality capture device according to claim 1, wherein the reality capture device has a lightweight construction designed for weight reduction.

6. The reality capture device according to claim 1, wherein the pivoting component comprises a radiation source for generating a measuring beam for time-of-flight-based distance measurement, particularly a laser source.

7. The reality capture device according to claim 1, wherein the reality capture device is embodied to be free of active temperature control for the four-point roller bearing, particularly wherein the reality capture device is embodied to be free of active temperature control.

8. The reality capture device according to claim 1, wherein the pivoting component is configured to set an acquisition direction for generating the probing data by the probing unit relative to the reality capture device, particularly wherein the pivoting component comprises a beam outlet for a measuring beam for time-of-flight-based distance measurement, wherein the four-point roller bearing is embodied as a bearing with a single bearing ring, wherein the pivoting component is supported only by the four-point roller bearing on the base part.

9. The reality capture device according to claim 1, wherein the probing unit is embodied as a laser scanner configured to carry out a scanning movement of a laser measurement beam, particularly relative to two rotation axes, and, based thereof, to generate light detection and ranging data for generating the digital representation of the environment.

10. The reality capture device according to claim 9, wherein the laser scanner comprises a rotating body for deflecting the outgoing laser measurement beam and returning parts of the laser measurement beam, the rotating body being mounted on the pivoting component and being rotatable relative to the pivoting component, wherein the light detection and ranging data are generated by a continuous rotation of the pivoting component about the pivot axis and a continuous rotation of the rotating body relative to the pivoting component while the laser measurement beam is emitted via the rotating body.

11. The reality capture device according to claim 1, wherein the reality capture device is specifically configured to be mounted on an unmanned aerial vehicle for indoor and outdoor flights or is embodied as an unmanned aerial vehicle for indoor and outdoor flights.

12. The reality capture device according to claim 1, wherein the recesses are perpendicular to the guide direction.

13. A reality capture device, comprising a probing unit configured to generate probing data for generating a digital representation of an environment, wherein the probing unit comprises a pivoting component configured to be pivoted relative to a base part of the reality capture device in order to generate the probing data, for which the pivoting component is mounted on the base part by a four-point roller bearing in the form of a pivot bearing with an outer race and inner race being under a preload against each other and which mutually support each other by rolling bodies arranged between them, wherein:
- the four-point roller bearing is configured as wire race bearing with the outer and inner race each hosting two raceway wires extending in a guide direction such that the rolling bodies can roll on the raceway wires to provide a pivoting of the inner race relative to the outer race about a pivot axis, each of the two raceway wires of a respective race being supported by a respective circumferential portion of the respective race, and
- at least one of the outer and inner race comprises recesses,
- wherein an arrangement and dimensions of the recesses are tuned to provide for an elasticity of at least one of the circumferential portions along a pressing direction onto the raceway wire supported by the at least one of the circumferential portions, such that in case of an increased pressure along the pressing direction due to a relative thermal size change between the outer and inner race within a predefined operating range, the preload is maintained within a predefined tolerance range around a nominal preload,
- wherein the at least one of the circumferential portions comprises along the guide direction several individually deformable segments supporting the respective raceway wire, each of the individually deformable segments being elastically deformable in radial direction independently of the other individually deformable segments, the radial direction being related to pivoting about the pivot axis,
- wherein the recesses are arranged at a plurality of locations in the guide direction and have an extent parallel to the pivot axis, wherein the recesses run parallel to the pivot axis, thereby providing lips spaced apart from one another in the guide direction, which lips can be elastically bent by forces applied thereto in the radial direction, thereby providing the individually deformable segments.

14. The reality capture device according to claim 13, wherein the at least one of the outer and inner race comprises a groove extending in the guide direction on the side of the one of the circumferential portions facing away from a contact surface of the one of the circumferential portions with the respective raceway wire, thereby providing freedom of movement of the lips in the radial direction.

15. The reality capture device according to claim 13, wherein the recesses are perpendicular to the guide direction.

16. A reality capture device, comprising a probing unit configured to generate probing data for generating a digital representation of an environment, wherein the probing unit comprises a pivoting component configured to be pivoted relative to a base part of the reality capture device in order to generate the probing data, for which the pivoting component is mounted on the base part by a four-point roller bearing in the form of a pivot bearing with an outer race and inner race being under a preload against each other and which mutually support each other by rolling bodies arranged between them, wherein:
- the four-point roller bearing is configured as wire race bearing with the outer and inner race each hosting two raceway wires extending in the guide direction such that the rolling bodies can roll on the raceway wires to provide a pivoting of the inner race relative to the outer race about a pivot axis, each of the two raceway wires of a respective race being supported by a respective circumferential portion of the respective race, and
- at least one of the outer and inner race comprises recesses,
- wherein an arrangement and dimensions of the recesses are tuned to provide for an elasticity of at least one of the circumferential portions along a pressing direction onto the raceway wire supported by the at least one of the circumferential portions, such that in case of an increased pressure along the pressing direction due to a relative thermal size change between the outer and inner race within a predefined operating range, the preload is maintained within a predefined tolerance range around a nominal preload,
- wherein the at least one of the outer and inner race comprises a groove extending in a guide direction on the side of the one of the circumferential portions facing away from a contact surface of the one of the circumferential portions with the respective raceway wire, thereby providing freedom of movement of the lips in the radial direction.

17. The reality capture device according to claim 16, wherein the recesses are perpendicular to the guide direction.

18. The reality capture device according to claim 16, wherein the at least one of the outer and inner race provides along the guide direction a number of the individually deformable segments which at least corresponds to half a number of the rolling bodies, wherein the number of the individually deformable segments at least corresponds to the number of rolling bodies.

19. The reality capture device according to claim 16, wherein both the raceway wires hosted by the at least one of the outer and inner race are supported by deformable segments, wherein the at least one of the outer and inner race comprises along the guide direction several further individually deformable segments supporting a further one of the raceway wires, each of the further individually deformable segments being elastically deformable in radial direction independently of the other of the further individually deformable segments,
- wherein the further individually deformable segments are formed by recesses arranged on the other of the circumferential portions of the at least one of the outer and inner race at a plurality of locations in the guide direction, which recesses have an extent parallel to the pivot axis, in particular which run parallel to the pivot axis, thereby providing lips spaced apart from one another in the guide direction, which lips can be elastically bent by forces applied thereto in the radial direction, thereby providing the further individually deformable segments.

* * * * *